United States Patent
Andres (10) Patent No.: US 11,109,525 B2
(45) Date of Patent: Sep. 7, 2021

(54) AGRICULTURAL PRODUCT BURYING UNIT HAVING A FORCE APPLYING DEVICE

(71) Applicant: KUHN S.A., Saverne (FR)

(72) Inventor: Christophe Andres, Waldolwisheim (FR)

(73) Assignee: KUHN S.A., Saverne (FR)

( * ) Notice: Subject to any disclaimer, the term of this patent is extended or adjusted under 35 U.S.C. 154(b) by 286 days.

(21) Appl. No.: 16/369,917

(22) Filed: Mar. 29, 2019

(65) Prior Publication Data

US 2019/0297772 A1    Oct. 3, 2019

(30) Foreign Application Priority Data

Apr. 3, 2018   (FR) .................................... 18 52896

(51) Int. Cl.
  *A01C 5/06*    (2006.01)
  *A01C 7/20*    (2006.01)

(52) U.S. Cl.
  CPC ............. *A01C 5/068* (2013.01); *A01C 7/203* (2013.01); *A01C 7/205* (2013.01); *A01C 5/064* (2013.01)

(58) Field of Classification Search
  CPC ......... A01C 5/064; A01C 5/068; A01C 7/203; A01C 7/205
  USPC ...................................................... 172/538
  See application file for complete search history.

(56) References Cited

U.S. PATENT DOCUMENTS

| 4,331,205 A | * | 5/1982 | Sorenson | A01C 7/203 111/135 |
| 4,408,551 A | | 10/1983 | Keller et al. | |
| 5,573,072 A | * | 11/1996 | Evans | A01B 63/26 172/397 |
| 5,619,939 A | | 4/1997 | Herman et al. | |
| 5,887,664 A | * | 3/1999 | Whalen | A01C 7/203 172/430 |

(Continued)

FOREIGN PATENT DOCUMENTS

| EP | 2 255 608 A1 | 12/2010 |
| WO | WO 2008/022373 A1 | 2/2008 |

OTHER PUBLICATIONS

French Preliminary Search Report dated Dec. 12, 2018 in French Application 18 52896, filed on Apr. 3, 2018 (with English Translation of Categories of Cited Documents and Written Opinion).

*Primary Examiner* — Gary S Hartmann
(74) *Attorney, Agent, or Firm* — Oblon, McClelland, Maier & Neustadt, L.L.P.

(57) ABSTRACT

An agricultural product burying unit for an agricultural machine, configured so as to be mounted in a fixed manner relative to the agricultural machine, includes: a reference device, and a burying device. The reference device is configured to rest on the ground in the work configuration and form a depth positioning reference for the burying device. The burying device is configured to bury an agricultural product in the work configuration. The reference device is configured to be mounted in an articulated manner directly on a reference which is fixed relative to the agricultural machine. The reference device is configured to weigh on the burying device in the work configuration, thereby forming a first device of applying a bearing force on the burying device.

12 Claims, 4 Drawing Sheets

(56) References Cited

U.S. PATENT DOCUMENTS

| | | | | |
|---|---|---|---|---|
| 6,148,747 | A * | 11/2000 | Deckler | A01C 7/203 111/137 |
| 6,325,156 | B1 | 12/2001 | Barry | |
| 7,681,656 | B2 * | 3/2010 | Jagow | A01C 7/203 172/538 |
| 7,984,768 | B2 * | 7/2011 | Schilling | A01C 5/068 172/566 |
| 8,904,945 | B2 * | 12/2014 | Naylor | A01C 5/068 111/186 |
| 8,985,234 | B2 * | 3/2015 | Gadzella | A01B 61/046 172/264 |
| 9,095,088 | B2 * | 8/2015 | Schilling | A01B 49/06 |
| 9,955,622 | B2 * | 5/2018 | Gadzella | A01B 15/18 |
| 10,194,572 | B2 * | 2/2019 | Roberge | A01B 49/04 |
| 10,251,326 | B2 * | 4/2019 | Andrews | A01C 5/064 |
| 10,448,557 | B2 * | 10/2019 | Martin | A01B 71/02 |
| 10,653,053 | B2 * | 5/2020 | Gadzella | A01B 63/008 |
| 2010/0300340 | A1 | 12/2010 | Harnetiaux | |
| 2012/0042811 | A1 | 2/2012 | Harnetiaux | |
| 2012/0042814 | A1 | 2/2012 | Harnetiaux | |
| 2014/0109808 | A1 * | 4/2014 | Schilling | A01B 49/06 111/121 |
| 2014/0109809 | A1 * | 4/2014 | Schilling | A01C 7/06 111/121 |
| 2019/0116723 | A1 * | 4/2019 | Sivinski | A01C 7/203 |
| 2020/0352089 | A1 * | 11/2020 | Kaiser | A01C 5/064 |

* cited by examiner

FIG. 1 Prior Art

Prior Art

AGRICULTURAL PRODUCT BURYING UNIT HAVING A FORCE APPLYING DEVICE

BACKGROUND OF THE INVENTION

Field of the Invention

The present invention relates to the general technical field of agricultural machinery and in particular the field of sowing and fertilizer burial.

The invention relates to a burying element for liquid or solid agricultural products. Such agricultural products can be liquid fertilizer or fertilizer in the form of granules, liquid insecticide or insecticide in the form of granules, or seeds.

Description of the Related Art

A fertilizer burying element is, for example, mounted on the front of a carrier beam supporting a precision-seeder element, either directly facing it, or offset relative to the precision-seeder element, and the seed outlet of the precision-seeder element, depending on whether it is desired to fertilise in the furrow receiving the seeds or beside, following a line parallel to this furrow.

FIG. 2 of patent application EP 2622954 B1 illustrates a precision seeder in which such a fertilizer burying element 5 is positioned slightly offset relative to the precision-seeder element 4.

Figures 1, 2, 3:
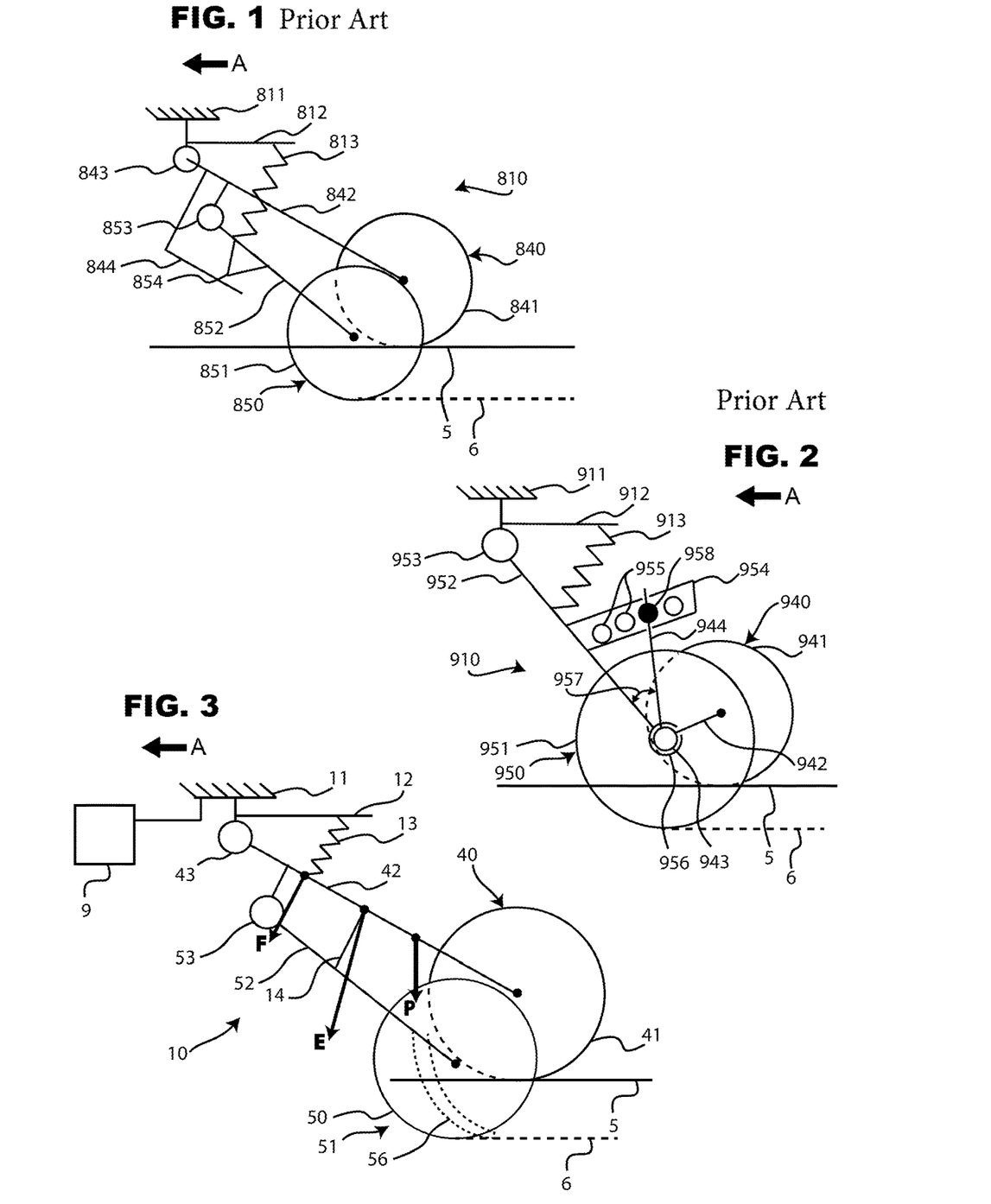
FIG. 1 illustrates diagrammatically a fertilizer burier element available on the market.
FIG. 2 illustrates diagrammatically a seed burier element available on the market.
FIG. 3 is an outline diagram of an agricultural product burier element according to the present invention.

Another known seed burier element 810 is represented diagrammatically in FIG. 1. The burier element 810 includes a reference device 840 and a burying device 850. The reference device 840 is mounted on a bracket 812 via a first pivot 843. This bracket 812 is itself mounted on a chassis 811 considered to form a fixed reference for the seed burier element 810. The reference device 840 includes a gauge wheel 841 designed to rest on the ground 5, and to act as a depth reference for the burying device 850. The burying device 850 includes a furrow opening disc 851 and an arm 852. The arm 852 supports the furrow opening disc 851. The arm 852 is mounted via a second pivot 853 on an arm 842 of the reference device 840. The furrow opening disc 851 is designed to open a furrow 6 in which the seeds will be placed. The arm 852 has an adjustable stop 854, while the arm 842 has a fixed stop 844. A spring 813 is mounted between the bracket 812 and the arm 852. The spring 813 tends to push the furrow opening disc 851 into the earth. The gauge wheel 841 limits the depth at which the furrow opening disc 851 can be driven in, since the adjustable stop 854 comes into contact with the fixed stop 844. In other words, the reference device 840 supports the burying device 850.

In this seed burier element 810 the driving-in force of the burying device 850 is applied by the spring 813. The reference device 840 is designed to limit the depth at which the furrow opening disc 851 can be driven in. This structure requires that the spring 813 must be designed to be massive, to ensure that the adjustable stop 854 is in contact with the fixed stop 844, and therefore that the furrow opening disc 851 does indeed reach the desired depth.

In the seed burier element 810 in FIG. 1, for a same setup of the elastic element, the modification of the depth adjustment by the adjustment of the stops 844 and 854 moves the arm 852 angularly relative to the reference device 840. The spring 813 then pivots around its attachment point on the bracket 912, and its length, i.e. its compression state, changes. These changes of direction and compression of the spring 813 modify in a non-zero sum manner the effect of the depth control force applied by the spring 813 on the burying device 850. The depth control force thus changes undesirably when the depth adjustment is modified.

A known fertilizer burier element 910 is represented diagrammatically in FIG. 2. This fertilizer burier element 910 includes a reference device 940 and a burying device 950. The burying device 950 is mounted on a bracket 912 via a first pivot 953. This bracket 912 is itself mounted on a chassis 911 which is considered to form a fixed reference for the fertilizer burier element 910. The burying device 950 includes a furrow opening disc 951, mounted at the end of an arm 952, and designed to open a furrow 6, in which fertilizer in the form of granules will be placed. A spring 913 is mounted between the bracket 912 and the arm 952 to allow the furrow opening disc 951 to be driven into the ground 5. The hub 956 of the furrow opening disc 951 is a through hub. The through hub 956 surrounds and supports a swivel pin 943 of a reference device 940. The reference device 940 also includes a gauge wheel 941 and an arm 942. A first end of the arm 942 is mounted on the pin 943. The gauge wheel 941 is mounted on a second end of the arm 942. The gauge wheel 941 is designed to rest on the ground, and be used as a depth reference for the furrow opening disc 951. In this fertilizer burier element 910, the arm 942 and the wheel 941 are positioned on the side of the furrow opening disc 951 opposite the arm 952. A control grid 954 with slots 955 is attached to the arm 952. An adjustment grip 944 of the reference device 940 can be adjusted in angular position relative to the arm 952, and locked in one of the slots 955. A locking means 958 is designed to hold the adjustment grip 944 in position relative to the control grid 954 (FIG. 2). Since the adjustment grip 944 and the arm 942 are fixed relative to one another, the adjustment of the grip 944 relative to the arm 952 of the burying device 950 causes the relative position of the gauge wheel 941 relative to the bracket 912 to change, and therefore causes the burying depth of the disc 951 to change.

In the system of FIG. 2, when the depth of the disc 951 is adjusted the change of the angular position 957 greatly displaces the arm 942 relative to the arm 952. The depth adjustment therefore acts simultaneously on the direction and the length—and therefore the state of compression—of the spring 913. As is the case with the burier element described with reference to FIG. 1, the changes of direction and compression of the spring 913 modify in a non-zero sum manner the effect of the depth control force applied by the spring 913 on the burying device 950. The depth penetration force thus changes undesirably when the depth adjustment is modified.

In the system of FIG. 2, adjusting the angular position 957 requires that the gauge wheel 941 is raised manually, which is a difficult operation, and a particularly constrictive one, since this adjustment must normally be applied to all the burying devices in the agricultural machine (sometimes 16, 24 or 36 rows, or more).

BRIEF SUMMARY OF THE INVENTION

The object of the invention is to propose a simple, improved alternative to the existing agricultural product burying systems, and one which is if possible less difficult to adjust.

The invention therefore relates to an agricultural product burying unit for an agricultural machine, configured so as to be mounted in a fixed manner relative to the agricultural machine, the burying unit including a reference device, a burying device, the reference device being configured to rest on the ground in the work configuration and form a depth positioning reference for the burying device, the burying device being configured to bury an agricultural product in the work configuration, the reference device being configured to be mounted in an articulated manner directly on a reference which is fixed relative to the agricultural machine. In the above burying unit the reference device is configured to weigh on the burying device in the work configuration, the reference device forming a means of applying a bearing force on the burying device.

Due to the application of the weight of the reference device on the burying device, in this case the reference device acts on the burying device towards the ground in the work configuration, not in the direction opposite the ground, as is the case with the device 810 illustrated in reference to FIG. 1. In other words, in the device 810 the weight of the reference device is lost, whereas in the present invention its weight is used to improve the driving-in of the burying device. The burying device therefore benefits from the load of the weight of the reference device when being driven in. It is thus possible to limit the dimensions of a possible second means of applying a bearing force on the burying device or, when the weight of the reference device is sufficient to ensure that the burying device can be driven in to a desired depth, to dispense with a second bearing force applying means, separate from the reference device.

Advantageously, the burying unit includes a second bearing force applying means, the second bearing force applying means being configured to apply an additional bearing force on the reference device.

In a particular configuration of the burying unit the second bearing force applying means helps apply, or itself applies, the additional bearing force on the reference device.

Advantageously, the second bearing force applying means is configured to apply the bearing force on the reference device in the work configuration, the reference device being configured to transfer the bearing force on to the burying device.

Advantageously, the second bearing force applying means can be adjusted at several positions relative to the reference device, or relative to a bracket which is fixed relative to the agricultural machine, so as to enable the bearing force exerted by the second bearing force applying means on the reference device to change in the work configuration.

Advantageously, the second bearing force applying means includes an elastic element configured to apply the bearing force on to the reference device in the work configuration.

Advantageously, the positioning and/or tensioning of the elastic element can be adjusted. The bearing force applying means can thus include a positioning adjustment device, for example to adjust the position of a compression spring. The bearing force applying means can also, alternatively or in combination with the positioning adjustment device, have a length adjustment device and/or a tensioning adjustment device, for example in the case of a compression spring to adjust the length of the compression spring.

Advantageously, the elastic element includes a compression spring, a tension spring, a torsion spring or a torque tube.

Advantageously, the second bearing force applying means is a device with removable weight(s) including at least one removable weight.

Advantageously, the reference device includes a gauge wheel, and/or the burying device includes a furrow opening element and agricultural product outlet means.

Advantageously, the burying unit includes a depth control device, configured to make it possible to adjust the burying depth by the burying device, relative to the reference device. Using this adjustable stop, and with the arrangement in which the reference device is configured to weigh on the burying device in the work configuration, depth adjustment is particularly simple. Indeed, depth adjustment is carried out in the machine's raised position. In this raised position the reference device no longer presses on the depth control device. In this configuration of the invention the user does not therefore have to raise the reference device to adjust the burying depth, contrary to the burying device of FIG. 2, nor to exert a force against a bearing force applying means, such as the spring 813 of the burying device of FIG. 1, which presses the burier element 850 against the fixed stop 844. Depth adjustment is therefore facilitated for the user.

In addition, in a particular example embodiment in which the burying unit also includes an elastic element, the bearing force of the elastic element is not dependent on the burying depth. Indeed, the reference device rests on the ground (in the prior art as well as in the invention), at a distance considered constant from the chassis of the respective agricultural machine, which is itself at a fixed height relative to the ground. In this example embodiment the elastic element is advantageously not affected by a change of burying depth; in other words the bearing force applied to the burying device by the elastic element is constant whatever the burying depth may be. The adjustment of the burying unit is therefore more reliable and predictable than in the prior art.

Advantageously, the depth control device includes an adjustable stop, the adjustable stop being able to take at least two separate positions, each of the two positions corresponding to a burying depth of the agricultural product by the burying device.

Advantageously, the adjustable stop is a coiled stop preferentially including position holding means, preferentially in the form of concave depressions.

As a variant, the positioning of the adjustable stop can be adjusted by screwing.

Advantageously, the invention relates to an agricultural machine including an agricultural product burying unit as described above.

BRIEF DESCRIPTION OF THE SEVERAL VIEWS OF THE DRAWINGS

Other features and advantages of the invention will become apparent from the non-restrictive example embodiments of the invention below and the attached drawings, in which.

DETAILED DESCRIPTION OF THE INVENTION

FIG. 3 illustrates diagrammatically the structural principle of a burying unit 10 to release an agricultural product. A particular example embodiment 20 of the burying unit 10 is then described in greater detail with reference to FIGS. 4 to 6.

The agricultural product released by means of the burying unit 10 is, for example, fertilizer in a solid form (such as granules), liquid fertilizer or seeds. A plurality of burying units 10, such as the one described below, can be used in an agricultural machine 9 (represented very diagrammatically in FIG. 3), where their number is equal to a number of working rows. The agricultural machine is then, for example, a sowing or fertilisation machine.

As can be seen in FIG. 3, the burying unit 10 in this case includes a bracket 12, a reference device 40 forming a first bearing force applying means, a second bearing force applying means 13 (optional), and a burying device 50.

The bracket 12 is non-restrictively attached to a chassis 11 of an agricultural machine. In the present description the terms "front", "rear", "upper", and "lower" are used with reference to a general direction of advance A of the agricultural machine. The direction of advance A is illustrated by an arrow in FIGS. 3 to 6.

Figure 4:
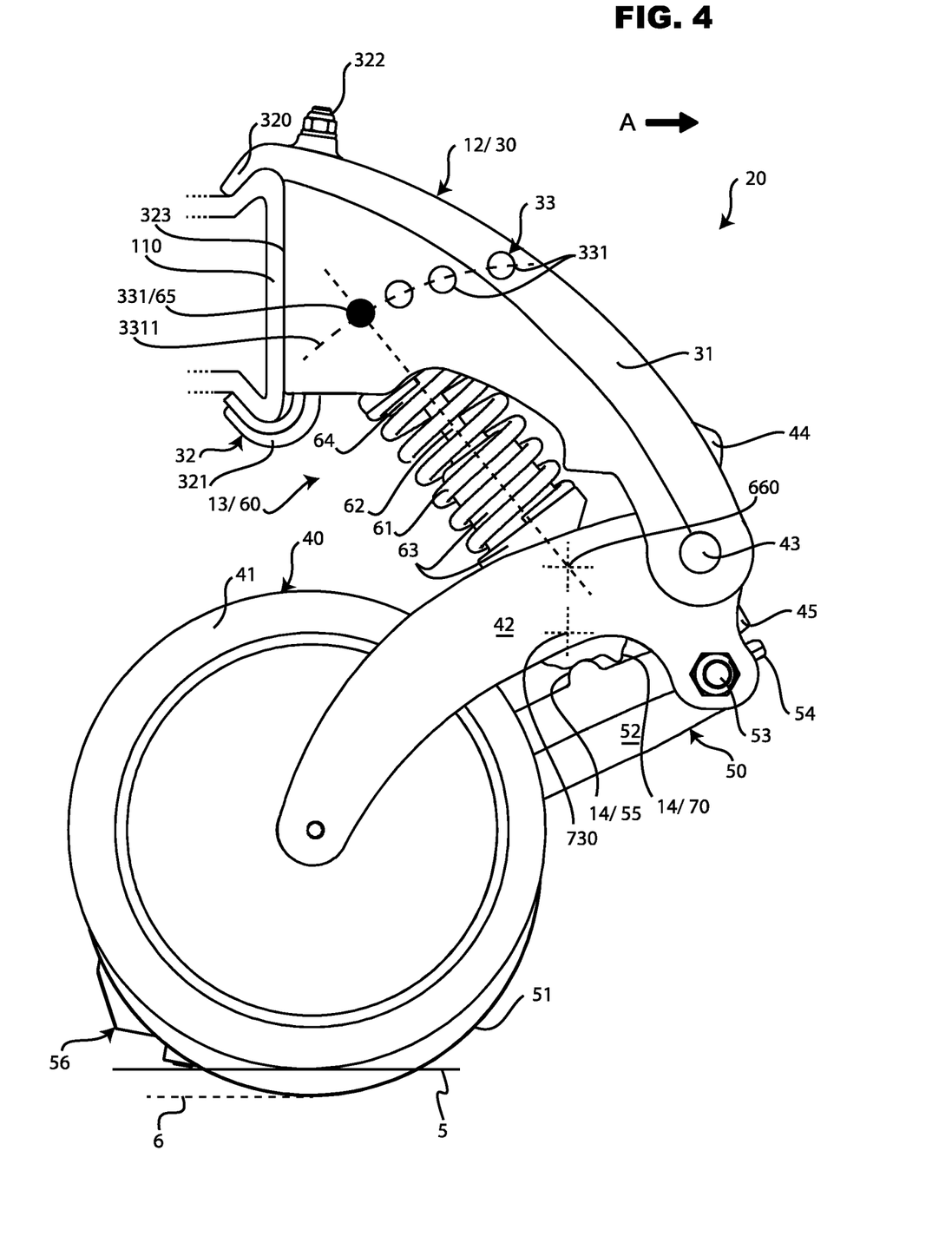
FIG. 4 is a side view of an example embodiment of the burier element of FIG. 3 in work configuration.
Figure 5:
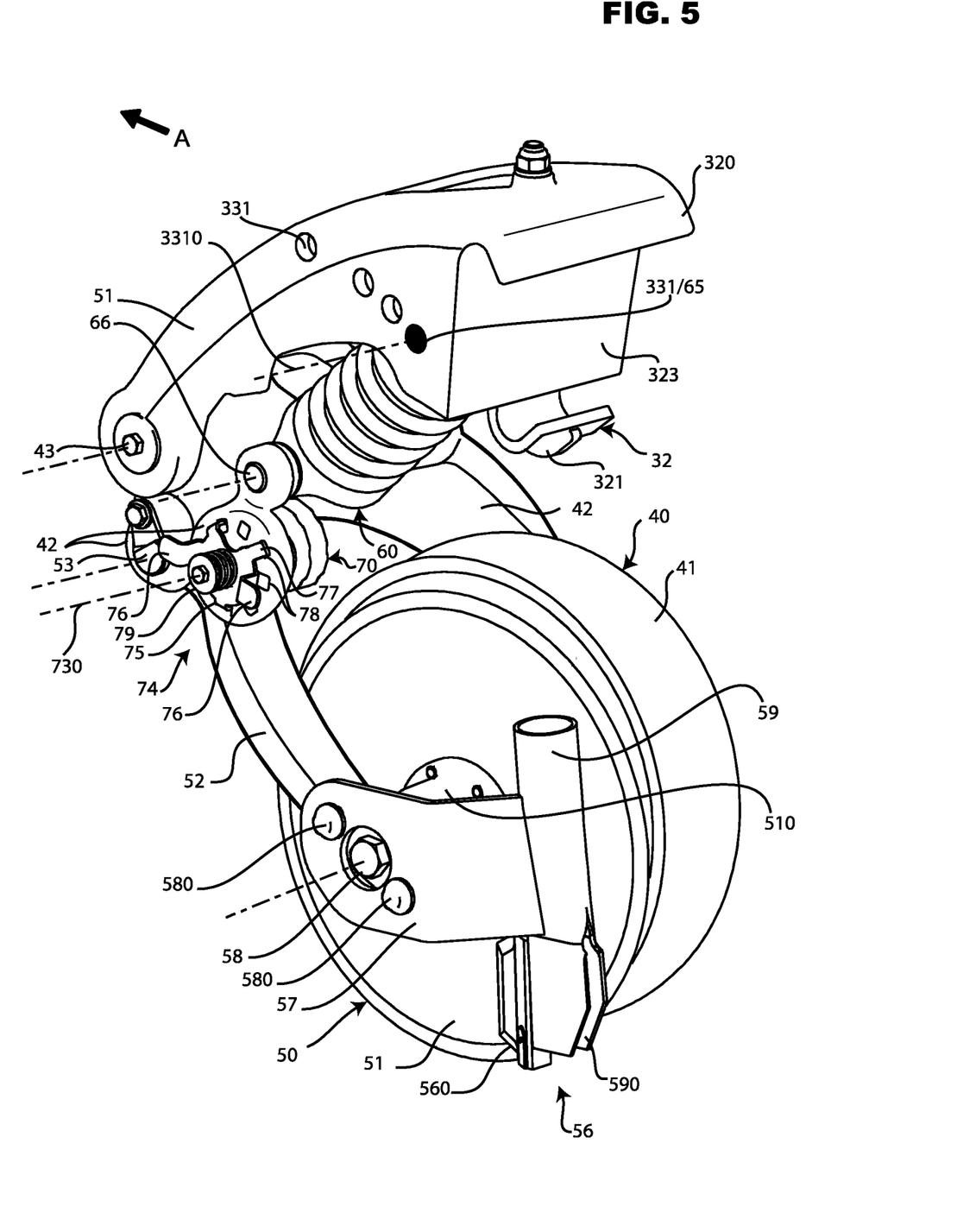
FIG. 5 is a perspective view of the opposite side of the burier element of FIG. 4.
Figure 6:
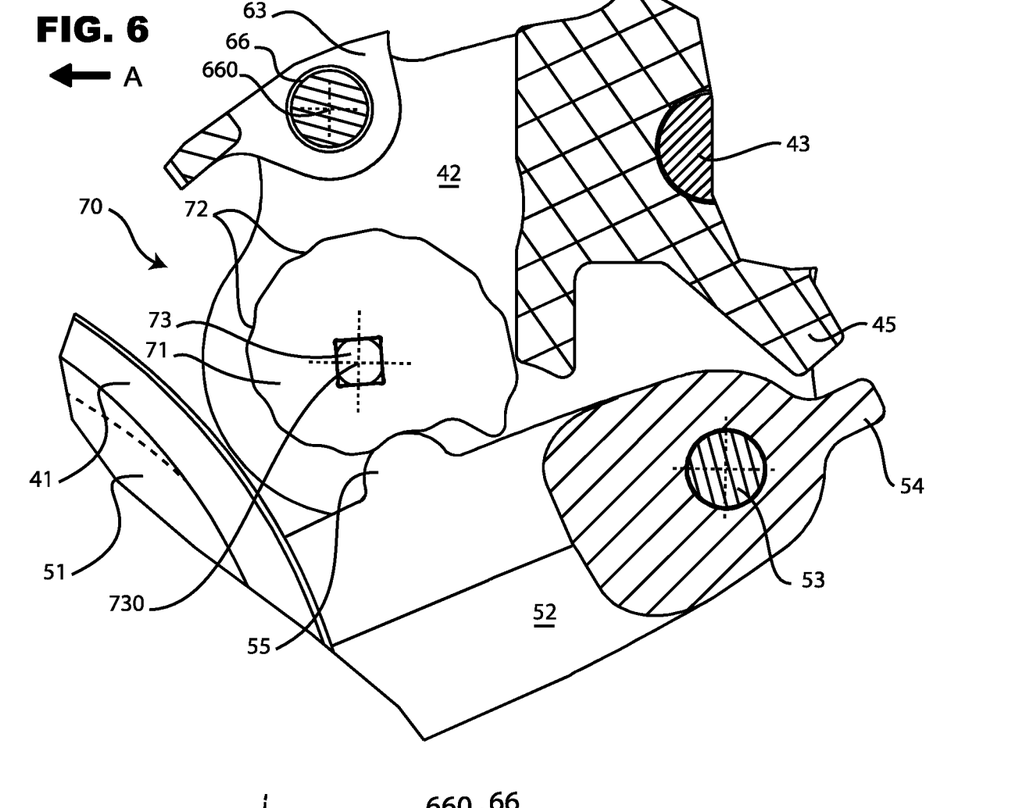
FIG. 6 is a detail of a burying depth adjustment stop which the fertilizer burier element of FIGS. 4 and 5 may include.

The bracket 12 can be designed to non-restrictively extend at the front of a beam 110 of the chassis 11, as in the example embodiment illustrated in FIGS. 4 to 6. Alternatively, and again non-restrictively, the bracket 12 can extend under a beam of the chassis 11, or to the rear of it. In an example embodiment illustrated in FIG. 4, the beam 110 has a dovetail-shaped front section. This shape is, however, not restrictive, and the beam 110 can have a square, rectangular or other shape. The reference device 40 includes a pivot 43, an arm 42 and a gauge wheel 41.

The arm 42 is mounted by a first end on the bracket 12 via the pivot 43. The gauge wheel 41 is mounted on a second end of the arm 42.

During work, the gauge wheel 41 rests on the ground 5 and rolls over it.

In a general sense, the reference device 40 forms a depth reference element for the burying device 50.

The reference device 40 is articulated on the bracket 12 independently of the burying device 50. In other words, the reference device 40 is articulated on the bracket 12, without any kinematic interposition of the burying device.

More generally, the reference device 40 is mounted by a mechanical connection to a reference which is fixed relative to the agricultural machine, independently of the burying device. As described above, the fixed reference is the bracket 12, which is attached to the chassis 11 of the agricultural machine. As a non-illustrated variant, the fixed reference is, for example, the chassis 11 of the agricultural machine.

As another non-illustrated variant, the mechanical connection between the reference device 40 and the fixed reference is an element other than pivot 43. The mechanical connection can thus non-restrictively be a sliding joint or a connection by a deformable mechanism, such as a parallelogram.

The burying device 50 includes a pivot 53, an arm 52, a burying means 51, which is in this case a furrow opening disc, and a burying element 56.

The arm 52 is mounted by a first end on the arm 42 via the pivot 53. The pivot 53 extends beneath 43 (FIG. 4). The pivot 53 enables the burying device 50 to retract upwards during work when it encounters an obstacle such as a stone. The furrow opening disc 51 is mounted on a second end of the arm 52. The furrow opening disc 51 is designed to cut the ground. The burying element 56 follows the furrow opening disc 51. The burying element 56 includes a coulter designed to open a furrow 6 in the ground 5, for example the coulter 560 described with reference to FIGS. 4 and 5. The agricultural product is then placed in this furrow 6 by the burying element 56.

The second bearing force applying means 13 is, in this case, an elastic element such as a compression spring. The role of the second bearing force applying means 13 is to exert a bearing force on the reference device 40 so as to force the gauge wheel 41 against the ground 5, and to hold the gauge wheel 41 in contact against the ground 5, to guarantee that the product is placed at the desired depth.

A stop 14 is inserted between the arms 42 and 52. In this case the stop 14 is arranged on the arm 52. The stop 14 acts as a point of contact of the arm 42 on the arm 52, in an intermediate point of the arm 52 between the furrow opening disc 51 and the pivot 53. Due to this contact, the weight P of the reference device 40 applies to the burying device 50 and helps drive it into the ground 5. The reference device 40 thus forms a first means of applying a bearing force on the burying device 50, the weight P being a first bearing force. The structure of the burying unit 10 illustrated in FIG. 3 is therefore designed such that the reference device 40 weighs on the burying device 50. The reference device 40 also transfers to the burying device 50 the second bearing force F exerted on it by the second bearing force applying means 13. The total driving-in force E applying to the burying device 50 is thus the sum of the bearing force F exerted by the second bearing force applying means 13 on the reference device 40, and of the weight P of the reference device 40 (see arrows F, P and E in FIG. 3). Thus, thanks to the application of the weight of the reference device 40 on the burying device 50, the bearing force F applied by the second bearing force applying means 13 to cause the burying device 50 to be driven into the ground 5 can be decreased. The second bearing force applying means 13 can therefore be made lighter, and of smaller dimensions than the known solutions, or even eliminated when the weight P is sufficient to achieve the desired burying depth.

As variants, the bearing means formed by the stop 14 can be made in a different manner, for example be positioned on the arm 42, or alternatively result from cooperating elements, such as the protrusion 55 and the depth control device 70 described below (FIG. 4).

The example embodiment 20 of the burying unit 10 is described below with reference to FIGS. 4 to 6.

The bracket 30 (FIG. 4) is a particular example embodiment of the bracket 12 (FIG. 3). The bracket 30 includes an arm 31 and a fixing device 32.

The fixing device 32 in this case has an upper hook 320, a lower hook 321 and a clamping system 322.

In this case the upper hook 320 is made in one piece with the arm 31, whereas the lower hook 321 is movable, and can be adjusted relative to the arm 31, in this case vertically. As a non-illustrated variant, the upper hook 320 is movable, and can be adjusted relative to the arm 31. The lower hook 321 can also be made in one piece with the arm 31 when the upper hook 320 is fixed, or made in one piece with the arm 31.

A front face 323 of arm the 31 is in this case vertical. The upper hook 320, the lower hook 321 and the front face 323 in this case form a housing with a dovetail-shaped section, matching the front section of the beam 110. Thus, in its represented configuration, the fixing device 32 is designed to hook on to a corresponding external profile of the chassis 11 of an agricultural machine, in this case the external profile of the beam 110. The clamping system 322 in this case includes a screw for attaching it to and holding it in position on the chassis 11.

The arm 31 in this case extends forwards and downwards from the beam 110 (FIG. 4).

The bracket 30 also includes an upper fixing device 33. The upper fixing device 33 in this case has a plurality of holes 331 and a first rod 65. The holes 331 are made in the arm 31, in this case, non-restrictively, in proximity to the fixing device 32. The holes 331 preferably pass through the arm 31 from side to side, preferentially horizontally and transversely to the intended direction of advance A of the machine. The holes 331 are made beside one another, in this case, not restrictively, along an arc of a circle 3311 as seen from a side view of the burying unit 10 (FIG. 4). Preferably, but not restrictively, in the illustrated example embodiment, the arc of a circle 3311 is centred as seen from a side view on the rotation axis 660 of a second rod 66, on which a compression spring 61 described below is mounted. The shape of the first rod 65 matches that of the holes 331, so that it can be mounted in a fixed but removable manner in one of the holes 331 (for example along the axis 3310 which is common to the rod 65 and to the corresponding hole 331, as illustrated in FIG. 5).

The reference device 40 in this case includes (FIGS. 4 to 6), in addition to the elements described with reference to FIG. 3, a first stop 44 and a second stop 45. The stops 44 and 45 are in this case both made in one piece with the arm 42. The stop 44 forms a lower stop, i.e. it restricts the lowering of the reference element 40 when the agricultural machine is raised, and therefore when the burying unit 10 is raised. The stop 44 then comes into contact against a corresponding transverse element belonging, for example, to the arm 31. The stop 45 forms a contact element for the stop 54 described below.

The burying device 50 in this case includes (FIGS. 4 to 6), in addition to the elements described with reference to FIG. 3, a stop 54, a protrusion 55 and a burying element 56.

The stop 54 forms a lower stop (FIGS. 4 and 6), i.e. it restricts the lowering of the burying device 50 when the agricultural machine is raised, and therefore when the burying unit 10 is raised. The stop 54 then comes into contact against the stop 45 of the reference device 40. The stop 54 is in this case a projection, which is made in one piece with the arm 52. The stop 54 is in this case mounted in immediate proximity to the pivot 53, opposite the furrow opening disc 51 relative to the pivot 53.

The protrusion 55 (FIGS. 4 and 6) forms a contact element against a coiled stop 71 described below, the protrusion 55 and the coiled stop 71 forming part of a depth control device 70.

The burying element 56 (FIG. 5) in this case includes a flange 57, a coulter 560 and a drop tube 59.

On its front end, the flange 57 is attached to the arm 52 by fixing means 580, in this case screws, of which there are non-restrictively two. A fixing device 58, in this case also a screw, makes it possible to attach the hub 510 of the furrow opening disc 51 to the arm 52.

The drop tube 59, of which only the lower end is represented in FIG. 5, is attached to a rear end of the flange 57. The drop tube 59 is connected to an outlet of a tank (not represented) of the agricultural product which the machine comprises. The drop tube 59, as illustrated in this case, is designed to release fertilizer in the form of granules in the furrow 6. The fertilizer is released from a lower outlet 590 of the drop tube 59 (FIG. 5), on the ground 5, in this case in the furrow 6.

The lower end of the drop tube 59 is attached to the coulter 560, to its rear. The elastic element 60 (FIG. 4) is a particular example embodiment of the second bearing force applying means 13 (FIG. 3). The elastic element 60 is in this case adjustable using a positioning adjustment device. This positioning adjustment is in this case permitted by the upper fixing device 33 described above. The elastic element 60 comprises a compression spring 61, a lower stud 63, an upper stud 64, a first rod 65 and a second rod 66.

The compression spring 61 is mounted on the studs 63 and 64, between them. The upper stud 64 is mounted on the arm 31 in one of the holes 331 via the first rod 65 (FIGS. 4 and 5). The rod 65 can be held in place by a pin, for example an automatic pin. The lower stud 63 is pivotably mounted on the arm 42 through the second rod 66 (FIGS. 5 and 6).

The elastic element 60 in this case also includes an adjustment device 62. The adjustment device in this case simultaneously forms a tensioning adjustment device and a length adjustment device. The adjustment device is in this case an adjustment screw 62. The adjustment screw 62 is in this case mounted in an inner bore of the lower stud 63. The adjustment screw 62 also extends longitudinally inside the compression spring 61, with which the adjustment screw 62 is coaxial. The end opposite the head of the adjustment screw 62 is stopped against the upper stud 64. In an adjustment configuration, the rod 65 is disengaged from the holes 331 and the compression spring 61 can pivot around the axis 660. Acting on the adjustment screw 62 makes it possible to adjust the length of the spring 61 to attach it to the arm 31. Through the adjustment screw 62, it is possible to place a non-illustrated hole of the upper stud 64 opposite of one of the holes 331. The rod 65 can then be inserted in the said hole 331 and in the hole of the upper stud 64, to attach the spring 61 relative to the arm 31 (FIGS. 4 and 5). The choice of the hole 331 determines the direction of the spring 61 relative to the second rod 66 and to the arm 42. The angular position of the spring 61 relative to the arm 42 will determine the direction of the bearing force F of the spring 61 on the arm 42.

The depth control device 70 includes the coiled stop 71 mentioned above, a shaft 73 and an indexing member 74. The depth control device 70 makes it possible to adjust the depth of the furrow 6 relative to the ground 5, and therefore, in this case, the working depth of the furrow opening disc 51 relative to the gauge wheel 41.

The coiled stop 71 is a contact element the diameter of which varies from its rotation axis 730. Non-restrictively, the coiled stop 71 has two flat lateral faces. The coiled stop 71 preferentially includes position holding means, in this case in the form of concave hollowings-out 72. The shape of the bottom of the concave hollowings-out 72 preferentially matches the shape of the protrusion 55, in order that the coiled stop 71 is held in its angular position satisfactorily.

The coiled stop 71 is mounted on the shaft 73, in this case in a fixed manner. In this case the shaft 73 is generally aligned in accordance with an axis 730 parallel to the axes 43 and 53, i.e. transversely to the general direction of advance A of the agricultural machine (FIG. 5). The coiled stop 71 can be mounted on the shaft 73 by welding, by screwing, by force, or by other attachment means or method.

The indexing member 74 has the form of a clamp 75 and a resetting device 79. The indexing member 74 also forms position holding element for the depth control device 70. The indexing member 74 is used to determine, and to maintain, a burying depth of the burying device 50 relative to the reference device 40.

The clamp 75 is a small plate with wings 76, teeth 77, notches 78.

The wings 76, of which there are two in this case, form a clamp gripping element 75. The teeth 77 are arranged projecting from the clamp 75.

The notches 78 are made as grooves in the arm 42. The teeth 77 can be engaged in the notches 78 by raising the clamp 75 and hold the clamp 75 in position against the arm 42.

The clamp 75 and the coiled stop 71 are rigidly fastened, in an angular manner, to one another, such that if the user changes the angular position of the clamp 75 the angular position of the coiled stop 71 can be adjusted. The clamp 75 is preferentially mounted in a sliding manner along the shaft 73, for example where the shape matches a section (for example a polygonal shape) of the shaft 73.

Figure 7:
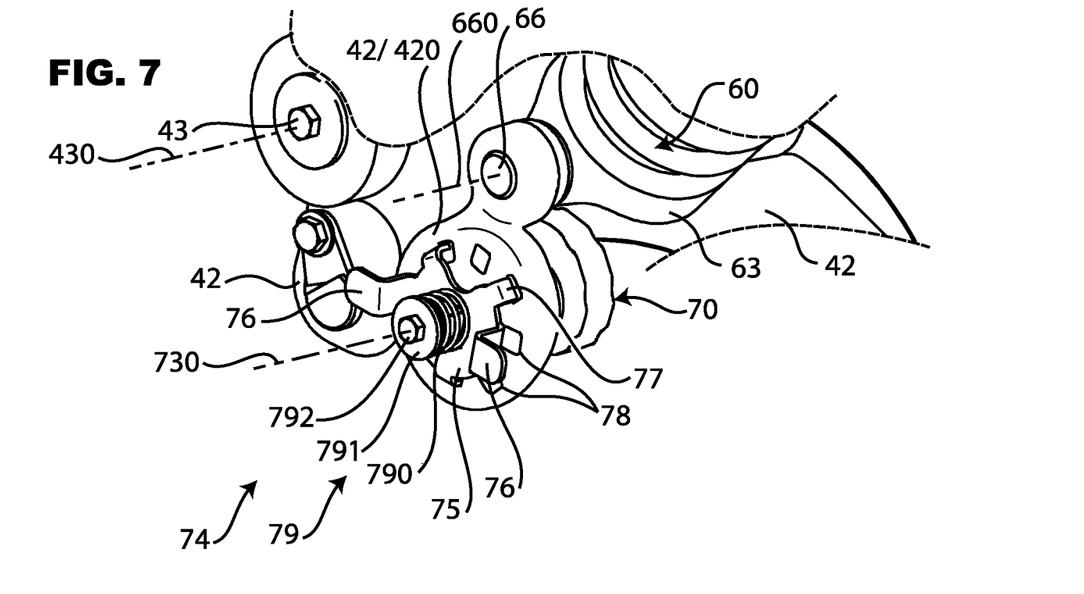
FIG. 7 is a perspective detail of a depth control device rotationally linked to the depth adjustment stop of FIG. 6.

The resetting device 79 in this case includes a spring 790, a washer 791 and a screw 792. The spring 790 is arranged around the shaft 73 and held against the clamp 75 and the shaft 73 by the spring 792 and the washer 791 (FIG. 7). The function of the resetting device 79 is to press the clamp 75 against the stand 420 belonging to the arm 42. In this manner, the teeth 77 are held in the notches 78. The position adopted by the indexing member 74 relative to the arm 42 can thus be maintained reliably.

Depending on the angular position taken by the coiled stop 71 around its rotation axis 730 relative to the arm 52 (or to the protrusion 55), the distance between the axis 730 and the arm 52 varies. It is thus possible to adjust the spacing between the arms 42 and 52, and therefore the height difference between the gauge wheel 41 and the furrow opening disc 51, and therefore to determine the burying depth of the burying device 50.

The position of the wings 76 enables the adjustment to be made to be identified, and enables it to be reproduced for the various burying units 10, 20 of the seed drill, so as to plant the agricultural product at a uniform depth from one row to the next.

The burying unit 20 is adjusted when the machine is in the raised position, i.e. firstly when the stop 44 is in contact with the arm 31, and secondly when the stop 54 is in contact with the stop 45. The elastic element 60 is thus not compressed between the arms 31 and 42, and adjusting it requires no effort for the user. Similarly, the depth control device 70 is not in contact with the arm 52. In the example embodiment described with reference to FIGS. 4 to 6, the depth control device 70 is adjusted without tools. Indeed, the coiled stop 71 is not in contact with the arm 52 in this raised position. The burying depth is therefore adjusted in a particularly simple manner, without any effort for the user. The burying unit 20 can thus be configured easily.

The reference device 40 is configured to rest on the ground 5 in the work configuration, and to form a depth positioning reference for the burying device 50. Indeed, the furrow opening disc 51 tends to rise under the effect of the friction forces of the ground 5 during work. The reference device 40 weighs on the arm 52 of the burying device 50 in the area around the stop 14, and opposes a rising movement of the burying device 50. Through the combined effect of the friction forces on the ground on the furrow opening disc 51 and the thrust exerted by the reference device 40 on the arm 52, the driving-in depth of the furrow opening disc 51 and of the coulter 560, and therefore the agricultural product's burying depth, are guaranteed.

As a non-illustrated variant, the elastic element 60, which has a compression spring 61, is replaced by another type of elastic element. The compression spring 61 is, for example, replaced by a tension spring, for example mounted on the other side of the arms 31 and 42 relative to the axis 43. A tensioning adjustment device such as a screw may be provided to adjust the tension of the tension spring. This tensioning adjustment device also makes it possible to adjust the length of the tension spring. By this means it is thus possible to adjust the position of the tension spring in a manner similar to the adjustment of the position of the compression spring 61 by the adjustment screw 62 and the rod 65.

The compression spring 61 can also be replaced by a torsion spring, or alternatively by a torque tube as described below. The torsion spring or torque tube can, for example, be mounted around the rotation axis 43 between the arm 31 and the arm 42. The type of the torque tube is, for example, that of the elastomer torsion element 34 represented in FIG. 3 of U.S. Pat. No. 6,454,019 B1. A torque tube of this kind has an external rigid sleeve, an internal rigid insert and a plurality of elastomer pads positioned between the sleeve and the insert. The sleeve can then be attached to one of the arms 31 or 42, while the sheath is attached to the other arm 42 or 31. The pivoting of the sleeve and the sheath relative to one another compresses the elastomer pads. Since the arm 31 forms a fixed reference for the torque tube, the compression of the elastomer pads enables the torque tube to apply a bearing force on the arm 42 with an effect similar to the bearing force exerted by the elastic element 60. If applicable, a tensioning adjustment device, for example a lever system, in which the lever can be locked in various positions relative to the arm 31 (two, three, four or more positions), would enable the bearing force of the torsion spring or torque tube on the arm 42 to be adjusted.

As a replacement for or an addition to the elastic element 60, the second bearing force applying means 13 can include a device with a removable weight or weights. A device with a removable weight or weights comprises for example one weight. The number of weights is not restrictive, and can differ, for example be equal to two, three, four or more. It is then possible to cause the weight to change through the addition or removal of one or more weight(s). When the device with a removable weight or weights has several weights it is preferable that all the weights should be of the same shape and have the same mass. As a variant, at least one first weight is of a shape and/or mass different from at least one second weight.

As another, non-illustrated variant, the arm 52 is pivotably mounted directly on the rotation axis 43 between the arm 31 and the arm 42 such that the rotation axis 43 is a rotation axis common to the reference device 40 and to the burying device 50 relative to the bracket 30, the reference device 40 being however able to pivot around the axis 43 independently of the burying device 50.

In another non-illustrated variant, the depth control device 70 includes a stop separate from the coiled stop 71, for example a stop the positioning of which can be adjusted by screwing.

As another further variant, a second furrow opening disc is mounted on the burying device 50. Alternatively, the furrow opening disc 51 is replaced by a coulter. As another further alternative, the coulter 56 is configured for, simultaneously, cutting the ground, itself opening the furrow 6, and planting the agricultural product in it.

When possible, the different variants above can be combined with one another, in particular when they relate to separate elements.

The invention claimed is:

1. An agricultural product burying unit for an agricultural machine, the burying unit comprising:
a reference device; and a burying device, wherein the reference device is configured to rest on the ground in a work configuration and form a depth positioning reference for the burying device, and the burying device is configured to bury an agricultural product in the work configuration, wherein the reference device includes a first arm with a first end mounted in an articulated manner directly on a bracket which is fixed relative to the agricultural machine via a first pivot, and a gauge wheel mounted on a second end of the first arm, wherein the burying device includes a second arm with a first end mounted on the first arm via a second pivot, and a burying means mounted on a second end of the second arm, and wherein the second pivot is disposed beneath the first pivot such that the reference device is configured to weigh on the burying device in the work configuration thereby forming a first means of applying a bearing force on the burying device.

2. The agricultural product burying unit according to claim 1, further comprising a second bearing force applying means, the second bearing force applying means being configured to apply a bearing force on the reference device, the reference device transferring the bearing force to the burying device in the work configuration.

3. A burying unit according to claim 2, wherein the second bearing force applying means is configured to change the bearing force exerted by the second bearing force applying means on the reference device.

4. An agricultural product burying unit according to claim 2, wherein the second bearing force applying means includes an elastic element configured to apply the bearing force on the reference device in the work configuration.

5. The burying unit according to claim 4, wherein at least one of a tension of the elastic element is adjustable or a position of the elastic element is adjustable relative to at least one of the reference device or the bracket.

6. The burying unit according to claim 4, wherein the elastic element comprises a compression spring, a torsion spring, a tension spring or a torque tube.

7. The burying unit according to claim 1, further comprising a depth control device configured to enable a burying depth to be adjusted by the burying device relative to the reference device.

8. The burying unit according to claim 7, wherein the depth control device comprises an adjustable stop, the adjustable stop being able to adopt at least two separate positions, each of the two positions corresponding to a depth of burial of the agricultural product by the burying device.

9. The burying unit according to claim 7, wherein the depth control device is provided between the first arm of the reference device and the second arm of the burying device.

10. An agricultural machine including an agricultural product burying unit according to claim 1.

11. The burying unit according to claim 1, wherein the burying means includes a furrow opening disc or a coulter.

12. The burying unit according to claim 8, wherein the adjustable stop is a coiled stop.

* * * * *